Patented Apr. 28, 1925.

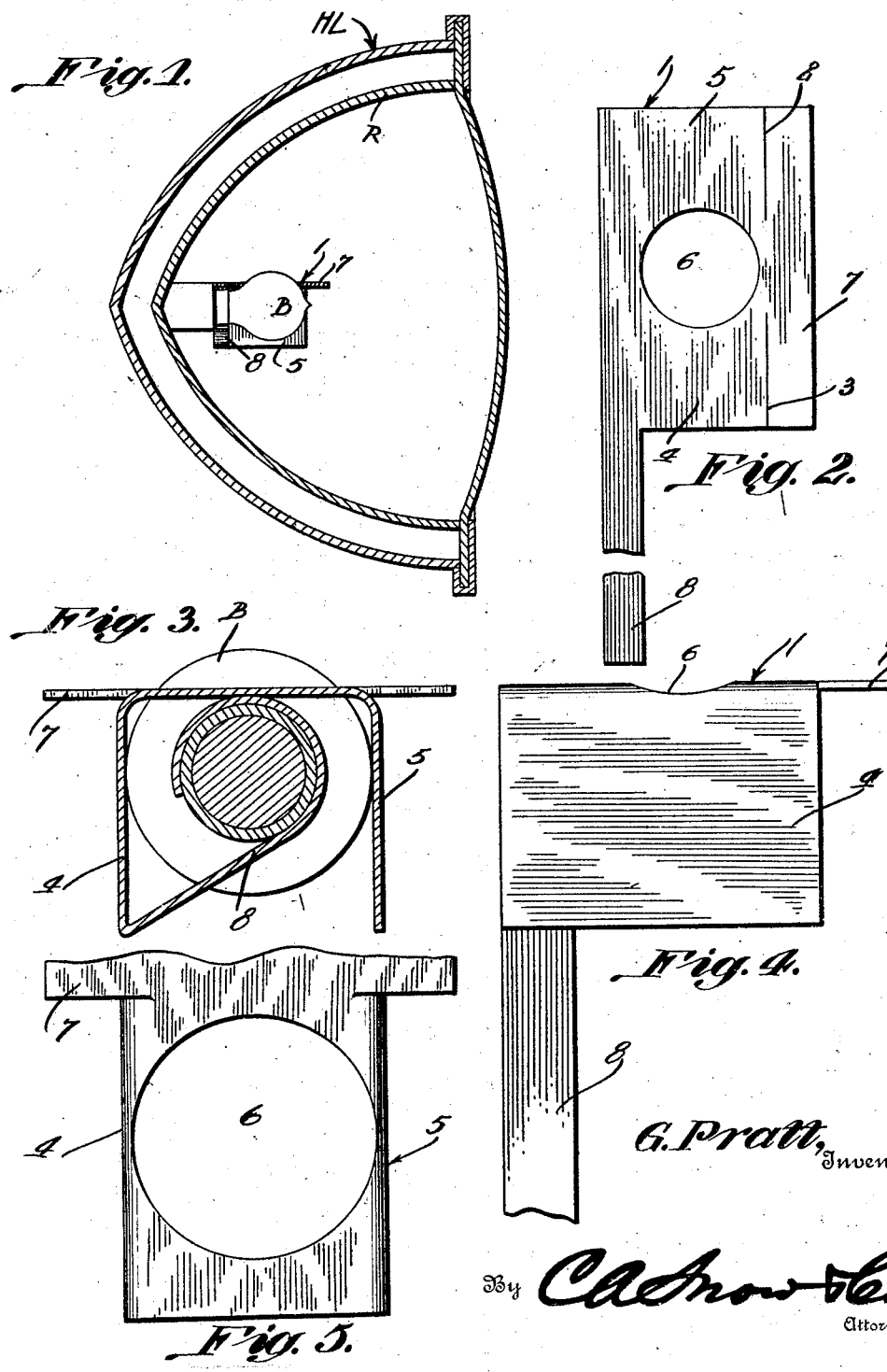

1,535,854

UNITED STATES PATENT OFFICE.

GLENN PRATT, OF SPRINGFIELD, MISSOURI.

DIMMER FOR AUTOMOBILE HEADLIGHTS.

Application filed March 5, 1923. Serial No. 622,974.

*To all whom it may concern:*

Be it known that I, GLENN PRATT, a citizen of the United States, residing at Springfield, in the county of Greene and State of Missouri, have invented a new and useful Dimmer for Automobile Headlights, of which the following is a specification.

This invention relates to dimmers for automobile headlights.

The object of the invention is to provide a simply constructed cheap and efficient device for application to the bulb of an automobile headlight so constructed and arranged that blinding of approaching drivers and pedestrians is prevented and yet sufficient light is shed to illuminate the roadway for the driver.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a vertical section through a headlight with this improved dimmer shown applied and in section.

Fig. 2 is a plan view of the blank from which the dimmer is constructed.

Fig. 3 is a detail section taken on the line 3—3 of Fig. 1.

Fig. 4 is a side elevation of the dimmer with parts broken out for convenience in illustration, and Fig. 5 is a top plan view with parts broken out.

In the embodiment illustrated, the dimmer 1 constituting this invention is preferably composed of aluminum or other suitable sheet metal and the blank or sheet from which it is formed is shown in Fig. 2, slits 2 and 3 being extended transversely from the side edges thereof inward and to the side members at the rear of these slits are bent downwardly to form wings 4 and 5 which are designed to straddle the light bulb B when applied as is shown clearly in Figs. 1 and 3.

This bending of the wings 4 and 5 form a substantially inverted U-shaped hood which has an opening 6 in its top, said opening being designed to fit over the top of the bulb B which projects therethrough and by means of which the dimmer is held seated on the bulb. The front portion of the hood is equipped with a transversely extending visor 7 which projects in front of the bulb when the device is applied and prevent the rays of light from impigning against the top of the reflector R of the headlight HL.

A metal strip 8 is carried by the rear end of the wing 4 and is designed to be bent up around the connection which unites the bulb B to the conductor as is shown clearly in Fig. 3 and which assists in holding the dimmer in operative position.

From the above description it will be obvious that this dimmer may be readily placed on the bulb of any headlight and when applied, will prevent the reflection from the sides of the reflector and the blinding of approaching drivers and pedestrians.

Various changes in the form, shape, proportion and other minor details of construction may be made without departing from the principle or sacrificing any of the advantages of the claimed invention.

I claim:—

1. A shield for automobile headlights comprising a one-piece sheet metal member having a body portion with an aperture therein to fit over the top of the headlight bulb and side wings extending downwardly therefrom to straddle the bulb, the front portion of said body member having a visor projecting forwardly in advance of the bulb to deflect the light rays against impigning the top of the deflector, and a bendable metal strip carried by one of the wings adapted to be bent around the connection which unites the bulb to its conductor to assist in holding the device in operative position.

2. A shield for automobile headlights comprising a substantially rectangular sheet metal blank having slits formed in the side edges thereof and extending inwardly to form a visor at the front and side wings, said wings being bent downwardly and adapted to straddle the light bulb, said sheet having an opening to fit over the top of the bulb to hold the shield seated on the bulb, one of said wings having a longitudinally extendable bendable strip to be folded around the bulb connection to assist in securing the shield in operative position.

In testimony that I claim the foregoing as my own, I have hereto affixed my signature in the presence of two witnesses.

GLENN PRATT.

Witnesses:
W. Y. SMITH,
ELSIE STRENCH.